O. KLUGE.
VERTICAL CUTTER ATTACHMENT FOR MOWING MACHINES.
APPLICATION FILED MAR. 13, 1916.
1,229,756.
Patented June 12, 1917.
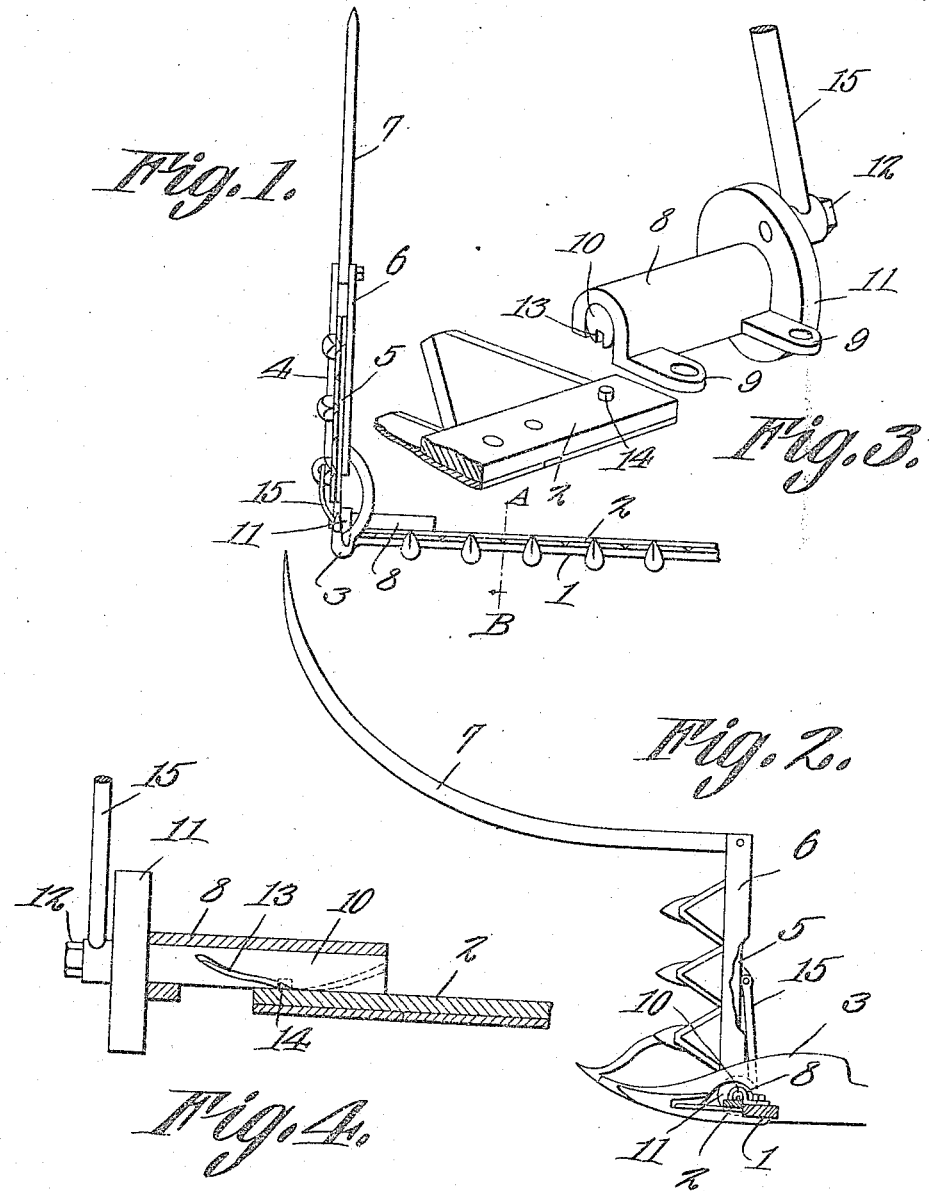
Witnesses
Otto Kluge
Inventor,
by
Attorneys.

UNITED STATES PATENT OFFICE.

OTTO KLUGE, OF GOLCONDA, ILLINOIS.

VERTICAL CUTTER ATTACHMENT FOR MOWING-MACHINES.

1,229,756.  Specification of Letters Patent.  Patented June 12, 1917.

Application filed March 13, 1916. Serial No. 83,969.

*To all whom it may concern:*

Be it known that I, OTTO KLUGE, a citizen of the United States, residing at Golconda, in the county of Pope and State of Illinois, have invented a new and useful Vertical Cutter Attachment for Mowing-Machines, of which the following is a specification.

This invention relates to a vertical cutter attachment for mowing machines.

One of the objects of the invention is to provide simplified mechanism for transmitting motion from a horizontal sickle bar to a vertical sickle bar, whereby a durable and efficient structure is obtained.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a front elevation of the vertical cutter attachment and a portion of the mowing machine to which it is connected.

Fig. 2 is a section on line A—B Fig. 1.

Fig. 3 is a perspective view of the power transmitting mechanism.

Fig. 4 is a longitudinal section through said mechanism.

Referring to the figures by characters of reference 1 and 2 designate the usual finger bar and sickle bar respectively of a mowing machine, there being a shoe 3 at the outer end of the finger bar and which shoe is of the ordinary construction.

The attachment constituting the present invention includes an upstanding finger bar 4 secured rigidly to the finger bar 1 back of the shoe 3, this finger bar 4 having a sickle bar 5 combined therewith, said sickle bar working between the finger bar 4 and a retaining plate 6, there being a forwardly and upwardly curved dividing rod or arm 7 secured between the upper ends of the finger bar 4 and the holding plate 6.

Secured upon the finger bar 1 close to the shoe 3 is a housing 8 preferably formed with outstanding ears 9 bolted or otherwise attached to the finger bar 1. In this housing there is mounted for rotation a short shaft 10 provided at one end with a disk 11 from which extends a wrist pin 12. Shaft 10 has a spiral groove 13 slidably engaged by a stud 14 upstanding from the adjacent end of the sickle bar 2. A pitman 15 connects the wrist pin 12 to the upstanding sickle bar 5.

It will be apparent that when the sickle bar 2 is reciprocated by any of the usual means provided for that purpose, the stud 14 will move back and forth relative to the shaft 10 and as this stud projects into the spiral groove 13, such reciprocation of the stud 14 will result in the back and forth rotation of the shaft 10 and a corresponding movement of the disk 11 and wrist pin 12. Thus the pitman 15 will transmit motion from the disk 11 to the sickle bar 5 and cause said sickle bar to be reciprocated.

Mechanism such as herein described is very simple and compact and is especially advantageous by reason of the fact that the parts will not become clogged readily and will operate with the minimum power.

What is claimed is:—

1. The combination with a finger bar and a sickle bar mounted for reciprocation relative thereto, of a housing fixedly connected to the finger bar, a shaft mounted for rotation in the housing and supported above the sickle bar, said shaft having a spiral groove, a stud upon the sickle bar and adapted to work within the groove, a disk at the end of the shaft and beyond the finger bar, and a pitman operated by the disk.

2. The combination with a finger bar and a sickle bar mounted for reciprocation relative thereto, of an inverted U-shaped housing secured to the finger bar and closed at the bottom by the sickle bar, a shaft mounted for rotation within the housing and above the sickle bar and having a spiral groove, a stud upon the sickle bar and projecting into the groove, a disk revoluble with the shaft, and a pitman actuated by the disk.

In testimony that I claim the foregoing as my own, I have hereto affixed my signature in the presence of two witnesses.

OTTO KLUGE.

Witnesses:
 E. A. PARKINSON,
 N. L. MCCLURE.